United States Patent

[11] 3,615,322

| [72] | Inventors | Burton S. Bogart;<br>Paul D. Dilliard, both of Lancaster, Ohio |
|---|---|---|
| [21] | Appl. No. | 763,958 |
| [22] | Filed | Sept. 30, 1968 |
| [45] | Patented | Oct. 26, 1971 |
| [73] | Assignee | Anchor Hocking Glass Corporation<br>Lancaster, Ohio |

[54] CHEMICAL STRENGTHENING OF GLASS ARTICLES PRODUCED WITH FLAME TREATMENT
10 Claims, No Drawings

[52] U.S. Cl.................................................... 65/30,
65/65, 65/104, 117/124
[51] Int. Cl........................................................ C03c 21/00
[50] Field of Search............................................ 65/30, 65,
104, 113, 120; 117/124

[56] References Cited
UNITED STATES PATENTS

| 3,287,201 | 11/1966 | Chisholm et al. | 65/30 X |
| 3,445,316 | 5/1969 | Megles | 65/30 X |
| 3,498,819 | 3/1970 | Lyle et al. | 65/30 X |
| 3,502,454 | 3/1970 | Shonebarger | 65/30 |

*Primary Examiner*—S. Leon Bashore
*Assistant Examiner*—John H. Harman
*Attorney*—Wood, Herron & Evans ABSTRACT: In the production of glass articles formed by a process including a flame treating step, and which are to be strengthened by ion exchange, much greater strength improvements can be obtained if alkali ions in the article are first exchanged with ions from an external source, and the article is thereafter subjected to the flame treatment rather than completing the flame treating step before ion exchange. The process has especially useful application in the production of blown soda-lime tumblers and similarly formed articles wherein a moil is cracked off leaving an edge requiring fire polishing and which is to be strengthened by an ion exchange technique.

CHEMICAL STRENGTHENING OF GLASS ARTICLES PRODUCED WITH FLAME TREATMENT

This invention relates to an improved method for strengthening glass articles which are to be subjected to flame treating. By the term "flame treating" is meant broadly the heating of a glass article by direct flame, to form or smooth an edge thereon or to impart a smoother or more brilliant surface to it. Flame treating thus includes operations known in the glass forming art as fire polishing, and fire glazing. Otherwise put, the invention concerns the strengthening, by ion exchange techniques, of articles which are formed with sharp, rough, or inaccurately formed edges or surface areas and which receive exposure to flame to form, smooth, brighten or polish such edges or areas.

Techniques have been developed for strengthening formed glass articles which involve exposing the article to a metal compound which provides metal ions that exchange with or replace different ions in the glass article. Among the metal compounds which can be used in such strengthening techniques are cuprous chloride, cuprous bromide, cuprous iodide, cupric sulfate, and others. In such strengthening methods, the glass article is heated and exposed to the metal ions for a period of time which may be from 1 minute to several hours. At the elevated temperature the metal ions contact the glassy surface and migrate or diffuse into the surface, and at least partially replace sodium ions in a zone of the glass network on and underlying the surface. This changes the chemical composition of the glass article in the affected zone by depleting its sodium content, thereby forming a new glass composition in situ which behaves as if it has a lower coefficient of expansion than the original glass. Upon cooling, the chemically changed ion-exchanged surface zone manifests its lower expansion rate by contracting less then the essentially unchanged interior of the article. As a result the surface zone is in compression around the cooled article, thereby improving the strength of the article as a whole. Several examples of such techniques are those disclosed in the copending patent applications of F. J. Shonebarger, Ser. No. 613,366, filed Oct. 17, 1966 and Ser. No. 626,504, filed Mar. 28, 1967, now Pat. No. 3,502,454, issued Mar. 24, 1970.

The simplicity of those strengthening methods, together with the high strength improvements they achieve in short treating periods, makes them useful in high-speed production techniques. These strengthening techniques are widely applicable, and can be used, for example, to strengthen a variety of products including containers, sheet glass, fibers and other articles, whether formed by pressing, molding, blowing or drawing techniques.

As a generality, ion exchange strengthening works well on a large number of different types of glass articles. Nonetheless, it has been observed that when applied to articles that are produced with a flame treating step, the ion-exchange techniques have not provided nearly as large strength increases as would usually be expected. For example, if ordinary soda-lime blown tumblers with fire polished rims are subjected to ion exchange treatment, the strength improvement is only a fraction of that obtained with other articles of similar compositions but which have not been exposed to flame. Since it is particularly desirable to impart high strengths to the rims of articles such as tumblers, lamp chimneys, and so on, which may be subject to concentrated impact forces in handling, the failure of previous ion exchange methods to yield the expected strength improvements is a serious detriment. The problem experienced with blown tumblers also arises in other instances where a burn-off fire polishing or fire glazing step is employed in fishing.

I have found that the strength of flame treated articles is highly dependent upon the sequence in which the flame treating and strengthening operations are carried out, and that flame treatment of the surface (or edge) after ion exchange can be used to finish the article without jeopardizing the achievement of a strength improvement. The ion exchanged surface responds differently to flame treatment than the "as formed" surface, but surfaces of comparable brilliance and smoothness can still be obtained. Thus, the detrimental affect of flame treatment on strength improvement can be avoided, but the beneficial and necessary effects of flame treatment can be retained.

As an illustration of the effectiveness of the invention, it may be mentioned that strength improvements of no more than about 40 percent (over the original impact strength) are obtained if finishing is conducted in the logical sequence, namely forming the article, then fire polishing it, then exposing it to the ion exchange material. In contrast, strength increases of up to 94 percent (or more than twice as much) have been obtained where the exposure to the ion exchange material is carried out before the fire polishing step.

Practice would ordinarily suggest the desirability of strengthening the article after flame treatment, contrary to this invention. In these ion exchange strengthening techniques, it has been the usual practice to carryout the ion exchange exposure as a final processing step on the completely formed article. Ordinarily (with articles not requiring flame treatment), high strength improvements can be obtained by carrying out the strengthening technique in that fashion.

Since strengthening is accomplished by imparting a thin surface zone or layer which is in compression, and since flame treatment may locally cause surface flow, it could be expected that any flame treatment would disrupt a preestablished compression layer on the surface and would thereby weaken the article. Yet contrary to expectation, that is not what happens. Flame treatment practiced after ion exchange does not harm the exchanged surface zone of the glass, but flame treatment before strengthening is very harmful to it.

The invention is primarily applicable to glasses which contain exchangeable sodium ions. Broadly such compositions include about 7 to 25 percent $Na_2O$ and 45 to 80 percent $SiO_2$, typically along with other constituents. This range includes most of the soda-lime glasses of commerce, which usually comprise about 65 to 74 percent $SiO_2$, 14 to 17 percent $Na_2O$, 7 to 12 percent (MgO +CaO) and up to 3 percent $Al_2O_3$. Smaller quantities (typically less than about 1 percent) of other conventional glass making oxides such as $K_2O$, $B_2O_3$, $Fe_2O_3$, BaO, ZnO, $Li_2O$, and $As_2O_3$ may also be present. The latter group includes by far the most important glasses of commerce, including the compositions of which most bottles, containers, window glass and so on are ordinarily made. In other words, the only limit on the range of compositions to which the invention is applicable is that the composition contain sodium ions in the glass network, and that those ions be exchangeable with cations from an external source. As a rule of thumb, I have found that the higher the soda content, the more pronounced the effect of the invention, and that especially useful results are obtained with soda contents of 14–17 percent. Ordinarily the presence of $B_2O_3$ in proportions of about 5 percent or more tends to restrict the exchangeability of sodium ions in the glass, and such glasses are not usually strengthened to a large degree by ion exchange.

Although the invention has potential applicability in any glass forming process wherein the article to be strengthened has an edge or surface that is to be flame treated, the new method achieves particularly useful results in the strengthening of blown tumblers which have a crack off edge. By way of further illustration, the invention is further described herein with particular reference to such articles.

It is conventional to form tumblers of soda-lime glass compositions by blowing. After blowing, the tumbler has a moil of extra glass that remains attached to it above the sidewall. The moil must, of course, be removed before the tumbler can be finished. Removal of the moil is commonly carried out by a crack-off procedure wherein the article is heated locally by flame to create a tension stress around a line corresponding to the desired tumbler rim. The heated area is then struck, as with a knife, and the impact travels around the line of tension stress thereby cracking off the moil which is removed. (Alternatively, a rim line can first be scratched, then heated to cause crack off.) This leaves a relatively sharp edge, and to round and smooth it the edge is fire polished. In this step the rim is subjected to a flame or gas jet which locally raises the temperature to a degree sufficient to permit the glass at the rim to flow from a sharp edge into a smooth rounded, safe surface. The fire polished edge is usually then annealed to remove any residual stresses left by the edge melting or fire polishing.

In accordance with the new method, tumblers with the sharp, newly cracked off edge are strengthened before fire polishing. In one illustrative example the particular ion exchange technique used involved exposure to cuprous chloride vapor with the tumblers heated above the annealing point.

The tumblers were made of a standard flint variety of soda-lime glass having the calculated composition:

| Oxide | Wt. percent |
|---|---|
| $SiO_2$ | 73.6 |
| $Na_2O$ | 15.1 |
| $K_2O$ | 0.2 |
| CaO | 5.9 |
| MgO | 3.8 |
| BaO | 0.3 |
| $Al_2O_3$ | 0.8 |
| $B_2O_3$ | 0.3 |
| $Fe_2O_3$ | 0.02 |
| $As_2O_3$ | 0.02 |

After crack off, the tumblers were placed in an oven and heated to 1100° F. When at temperature in the furnace the tumblers were exposed to cuprous chloride vapor at the same temperature for 120 minutes to effect the ion exchange. Where cuprous chloride is used as the strengthening medium, common salt, NaCl, is formed as a byproduct of the exchange reaction. This salt appears as a residue of film on the surface of the article after the ion exchange. The presence of the salt is undesirable, at least from an appearance standpoint, and it is removed by cooling the article, washing it with water, and drying it prior to the flame treatment which is to follow.

The still unfinished tumblers were then fire polished over the rim and annealed. This rounded the rim into a smooth, safe drinking edge.

As a control, a second set of tumblers were given the same treatment, but were fire polished immediately after crack-off, then were subjected to the ion exchange vapor at the conditions set forth above.

The comparative strengths of the rims of the tumblers were measured by a conventional AGR impact tester. Tumblers which had been fire polished with no ion exchange treatment at any stage had an average impact strength of 21.3 units as calibrated on the tester. The control set of tumblers, which were exposed to the strengthening step after fire polishing, had impact strengths of which were 25–40 percent higher than that of the untreated tumblers. In contrast, the tumblers which were given the ion exchange treatment before fire polishing, in accordance with this invention, had strengths averaging 41.4 units, or an improvement of 94 percent.

It can be seen that strength improvements of better than twice as much are achieved by carrying out the ion exchange step prior to flame treatment rather than subsequent to it.

In the foregoing example the invention was carried out with a cuprous chloride vapor phase strengthening technique. Similar results are obtained with other ion exchange compounds. In particular, other copper compounds, including cuprous bromide, cuprous iodide, and cupric sulfate, will bring about similar improvements when used in accordance with this invention. It is often advantageous to use a vapor state ion exchange material, but cupric sulfate can best be applied as a water spray to the rim edge.

In this connection, the use of cuprous iodide as the ion exchange strengthening material has been found to be especially advantageous in the present process. If this material is used as the ion exchange compound, the sodium salt formed by reaction is the iodide. Sodium iodide displays a substantially higher vapor pressure than sodium chloride, and it has been found that sodium iodide residue can be vaporized from the surface of the article almost completely at the temperatures prevailing in the ion exchange treating zone. This removes the salt residue so that virtually none remains on the surface at the end of the ion exchange treatment which would otherwise require removal by washing. Hence, by use of cuprous iodide it is possible to completely eliminate any intermediate cooling, washing, drying, and reheating steps between the ion exchange and flame treating operations.

In general, the measure of improvement afforded by the new method with any specific metallic ion exchange compound can be determined by comparing the strength achieved by that compound with the ion exchange step carried out in advance of the flame treating step, with the results obtained by carrying out the flame treating step ahead of the ion exchange step.

Soda-lime glass covers for watt-hour meters are formed by a process in which the meter cover is molded to desired form, then is fire glazed over its surface to remove minor mold marks and other imperfections and to make the surface generally smoother and more brilliant in appearance. In the fire glazing operation the surface is exposed to a direct gas flame sufficiently to permit localized surface flow at the surface of the article. Such meter covers, when strengthened in accordance with this invention by surface soda ion exchange with a cuprous halogen after forming, but before the fire glazing treatment, display higher breaking strengths than if exposed to the ion-exchange material after fire glazing. In fact, covers which are subjected to the ion exchange material after being glazed are apparently not strengthened at all.

Soda-lime tumblers are formed by blowing with a moil attached. The moil is removed by a burn-off operation in which jets of flame impinge radially on the tumbler and moil at the desired wall height and locally heat the wall sufficiently to melt through or "burn-off" the moil, leaving a rounded, safe edge. In accordance with this invention such articles are strengthened by exposure to the ion exchange medium prior to the burn-off, rather than after burn-off has occurred.

In the manufacture of ordinary flat window glass, the glass sheet is commonly cut to desired dimensions by scoring a line and cracking the glass along the line. This leaves a sharp edge which manifests small chip outs, nicks, cracks or other incipient flaws at the cut edge intersection. These defects which could provide loci for breakage can be removed by fire polishing the cut edge area. If such window glass is to be strengthened by an ion exchange technique, it is highly desirable to use the process of this invention, and to carry out the ion exchange treatment before any fire polishing, edge melting or other flame treatment is employed.

It is not fully understood why the method of this invention accomplish results so different from those which result when the flame treatment precedes the ion exchange step. Although it is not intended that this invention be bound by any explanation, it is theorized that flame treatment somehow removes or immobilizes a proportion of the replaceable sodium ions in the glass network at the surface. Thus, an article having an edge which has been fire polished is apparently relatively less rich in replaceable sodium than an edge which has not yet been fire polished. Since the ion exchange technique requires the presence of replaceable sodium ions, the smaller the amount of sodium that is present, the smaller the amount of ion exchange that can take place, and the smaller the resultant strengthening. Test data tends to confirm the presence of a reduced proportion of sodium in an edge which has been fire polished, although a substantial amount of sodium is still present. However, it is pointed out that this theory is presented not to limit the invention, but rather as an attempt to offer an explanation which is consistent with the observed results.

While I have described a preferred method of practicing this invention, the invention is susceptible of other embodiments and variations falling within the scope and spirit of the claims which follow.

What is claimed is:

1. A method of flame treating and strengthening a glass article having exchangeable sodium ions, said method comprising, forming the article with an area thereon which is to be flame treated, exchanging at least a portion of the sodium ions in said area of said article with cuprous ions from a source external to said article, at a temperature above the annealing point of said article, thereby altering the composition of said article in a surface zone in said area, flame treating said area after said ion exchange has taken place, then cooling the formed, flame treated article, thereby strengthening it.

2. The method of claim 1 wherein said article is flame treated by fire polishing.

3. The method of claim 2 wherein said article is formed of a glass composition including about 45 to 80 percent by weight $SiO_2$ and 7 to 25 percent $Na_2O$.

4. The method of claim 1 wherein said composition is a soda-lime glass.

5. The method of claim 1 wherein said article is formed by blowing and said area is a rim edge presented by cracking off a moil.

6. The method of claim 1 wherein said external source of metal ions is cuprous iodide and the reaction product of the exchange is vaporized from said area without intermediate cooling between said exchanging and flame treating.

7. The method of claim 1 wherein said metal ions are in the vapor state.

8. The method of claim 1 wherein said article is transferred from an ion exchange treating zone to flame treating apparatus, without intervening cooling to room temperature.

9. The method of claim 1 wherein said article is a blown tumbler having the composition, about 65-75 percent by weight $SiO_2$, 14-17 $Na_2O$, 7-12 percent ($CaO + MgO$) and up to about 3 percent $Al_2O_3$, and wherein said tumbler said tumbler has a crack-off edge.

10. The method of producing blown soda-lime tumblers comprising, blowing the tumbler with a moil attached to it, cracking off the moil thereby leaving an edge requiring fire polishing, strengthening said article by exposing side edge to a vaporized cuprous halogen compound at a temperature above the annealing point of the glass such that copper ions from said compound migrate into and partially replace sodium ions in said article adjacent said edge, then subjecting said edge to fire polishing after the ion exchange step has taken place.

UNITED STATES PATENT OFFICE
CERTIFICATE OF CORRECTION

Patent No. 3,615,322    Dated October 26, 1971

Inventor(s) Burton S. Bogart and Paul D. Dilliard

It is certified that error appears in the above-identified patent and that said Letters Patent are hereby corrected as shown below:

Column 6, line 20, change "side" to --said--.

Signed and sealed this 18th day of April 1972.

(SEAL)
Attest:

EDWARD M. FLETCHER, JR.
Attesting Officer

ROBERT GOTTSCHALK
Commissioner of Patents